(12) United States Patent
Sawada et al.

(10) Patent No.: US 7,627,907 B2
(45) Date of Patent: Dec. 1, 2009

(54) DISPLAY DEVICE PREVENTING UNAUTHORIZED COPYING

(75) Inventors: Munenori Sawada, Suwa (JP); Kazunori Hiramatsu, Okaya (JP)

(73) Assignee: Seiko Epson Corporation (JP)

( * ) Notice: Subject to any disclaimer, the term of this patent is extended or adjusted under 35 U.S.C. 154(b) by 809 days.

(21) Appl. No.: 11/010,245

(22) Filed: Dec. 10, 2004

(65) Prior Publication Data

US 2005/0212761 A1 Sep. 29, 2005

(30) Foreign Application Priority Data

Dec. 12, 2003 (JP) ............... 2003-414807

(51) Int. Cl.
*G02F 1/133* (2006.01)
(52) U.S. Cl. ............... 726/32; 345/212; 345/214
(58) Field of Classification Search ............... None
See application file for complete search history.

(56) References Cited

U.S. PATENT DOCUMENTS

| 5,475,398 | A | 12/1995 | Yamazaki et al. | |
|---|---|---|---|---|
| 6,037,954 | A * | 3/2000 | McMahon | 345/169 |
| 6,154,214 | A * | 11/2000 | Uyehara et al. | 715/863 |
| 6,209,030 | B1 * | 3/2001 | Ohashi | 709/219 |
| 6,329,964 | B1 * | 12/2001 | Tanaka | 345/8 |
| 6,331,867 | B1 * | 12/2001 | Eberhard et al. | 715/864 |
| 6,356,287 | B1 * | 3/2002 | Ruberry et al. | 715/864 |
| 6,827,454 | B2 * | 12/2004 | Kimura et al. | 353/122 |
| 6,861,640 | B2 * | 3/2005 | Light et al. | 250/221 |
| 6,940,497 | B2 * | 9/2005 | Vincent et al. | 345/204 |
| 7,006,116 | B1 * | 2/2006 | Meyers et al. | 345/156 |
| 7,362,320 | B2 * | 4/2008 | Payne et al. | 345/207 |
| 2002/0011972 | A1 | 1/2002 | Yamazaki et al. | |
| 2002/0158863 | A1 * | 10/2002 | Huh et al. | 345/211 |
| 2002/0171813 | A1 * | 11/2002 | Kimura et al. | 353/122 |
| 2005/0125673 | A1 * | 6/2005 | Cheng et al. | 713/182 |
| 2005/0265548 | A1 * | 12/2005 | Tsuchimura | 380/201 |

FOREIGN PATENT DOCUMENTS

| JP | 11-271799 | 10/1999 |
|---|---|---|
| JP | 2001-005787 | 1/2001 |
| JP | 2001-292276 | 10/2001 |
| JP | 2002-108267 | 4/2002 |
| JP | 2004-233657 | 8/2004 |
| WO | WO 97/22099 | 6/1997 |
| WO | WO 03/089250 | 10/2003 |
| WO | WO 2004/066156 A1 * | 8/2005 |

OTHER PUBLICATIONS

Search Report regarding corresponding European patent application.

* cited by examiner

*Primary Examiner*—Christian LaForgia
(74) *Attorney, Agent, or Firm*—Harness, Dickey & Pierce, P.L.C.

(57) ABSTRACT

The present invention is adapted to make all the pixels of electrophoretic display 17 white (step S103) when light no longer incomes on the face of electrophoretic display 17 ("Yes" at step S102). When someone places the face of electrophoretic display 17 on a contact glass of a copy machine to copy the contents on electrophoretic display 17 as they are, all the contents currently displayed on electrophoretic display 17 is deleted. As the result, the present invention can prevent the contents on electrophoretic display 17 from being easily copied by the copy machine as they are.

8 Claims, 8 Drawing Sheets

"We had ... We ... too tomorrow."

FIG. 9

DISPLAY DEVICE PREVENTING UNAUTHORIZED COPYING

BACKGROUND OF THE INVENTION

1. Field of the Invention

The present invention relates to a display device for displaying predetermined contents on a reflection display.

2. Description of the Related Art

This type of display devices includes a display device for displaying contents such as an electronic book on a reflection display such as a Cholestric liquid crystal or an electrophoretic display for showing the contents to a user as described in JP11-271799A.

Such a display device is adapted to display contents on its reflection display. Thus, as a display device become lighter and thinner, for example, the display device has a risk of an unauthorized copy letting someone place the screen of the reflection display on a contact glass of a copy machine with its face down and copy contents on its screen.

Generally, a conventional display device is so heavy and thick that nobody can place it on a contact glass of a copy machine. The industry does not seriously consider the risk of an unauthorized copy in the abovementioned way. The conventional copy protection method prevents data on contents from being copied and protects the contents against a copy from an electronic medium to another electronic medium. The conventional copy protection method is vulnerable to an unauthorized copying of contents displayed on a screen directly from the screen. The conventional display device is not protected by any technical means against the unauthorized copy, which is done by copying contents on the screen with imaging means such as a copy machine.

The present invention intends to solve the abovementioned technical problem. An object of the present invention is to provide a display device for protecting contents on the display screen against being imaged with an imaging section as they are.

SUMMARY OF THE INVENTION

In order to solve the abovementioned problem, a display device according to the present invention is a display device for displaying predetermined contents on a predetermined display, including a detecting section for detecting that the predetermined contents is a target of predetermined imaging means, and a display controlling section for switching the display state of the contents on a screen to a display state protecting the contents against being imaged if the detecting section detects that the predetermined contents is a target of predetermined imaging means. The display state protecting contents against being imaged includes a display state of deleting a part of the contents, a display state of deleting the whole of the contents, and a display state of displaying contents other than the contents.

The predetermined display may be a reflection display for displaying contents by reflecting outside light incoming on the screen.

The predetermined display may be a memory display for keeping displaying contents even after power supply stops.

The imaging means may be a copy machine, a scanner, or a digital camera.

With this configuration, the display device switches the display state of the contents on the screen to a display state protecting the contents against being imaged when someone tries to image the contents displayed on the screen. In this manner, the display device prevents the contents displayed on the screen from being easily imaged with imaging means as they are.

The detecting section may be adapted to detect something touches on the screen. The display controlling section may be adapted to switch the display state of contents on the screen to a display state protecting the contents against being imaged when the detecting section detects something touches on the screen.

The detecting section may be adapted to detect that the screen is shielded against light. The display controlling section may be adapted to switch the display state of contents on the screen to a display state of protecting the contents against being imaged when the detecting section detects that the screen is shielded against light.

When someone places the screen on a contact glass of a copy machine with its face down in order to copy contents displayed on the screen and the face of the screen touches the contact glass, or the screen is shielded against light, the display device can switch the display state of contents on the screen to a display state of protecting the contents against being imaged, with this configuration. Thus, the display device can prevent contents displayed on it from being easily copied with a copy machine as they are.

The detecting section may be adapted to detect an amount of light incoming on the screen. The display controlling section may be adapted to switch the display state of contents on the screen to a display state of protecting the contents against being imaged when the amount of light incoming on the screen detected by the detecting section is equal to or more than a predetermined threshold.

When someone places the screen on a contact glass of a copy machine with its face down in order to copy contents displayed on the screen and then the copy machine emits scanning light over the contact glass, the display device can switch the display state of contents on the screen to a display state of protecting the contents against being imaged, with this configuration. Thus, the display device can prevent contents displayed on it from being easily copied with a copy machine as they are.

A driving method of the display is an active matrix driving method. The detecting section includes a photo receiver provided for an active device corresponding to each pixel of the display.

The display device can detect light incoming on the screen (for example, scanning light emit from a copy machine or flash light emit from an imaging device) even when a user shields a photo receiver against light on purpose or by accident, with this configuration. Thus, the display device can surely prevent contents on the display from being easily imaged with imaging means as they are.

The detecting section detects an amount of light incoming on each of different places on the screen. The display controlling section switches the display state of contents on the screen to a display state of protecting the contents against being imaged when a difference between the amounts of light incoming on the different places on the screen detected by the detecting section is equal to or more than a predetermined threshold. The different places on the screen can be the places near the opposite sides of a frame of the screen or the places near the opposite corners of a frame of the screen.

When someone places the screen on a contact glass of a copy machine in order to copy contents displayed on the screen, then the copy machine starts emitting scanning light over the contact glass with the scanning light just incoming on the upper part of the face of the screen but not on the lower part of the face of the screen yet, the display device can switch the display state of contents on the screen to a display state of protecting the contents against being imaged with this configuration. Thus, the display device can prevent contents on the display from being easily imaged with a copy machine as they are.

The display device includes a determination section for determining whether contents displayed on the screen are allowed to be copied, and an operation forbidding section for forbidding an operation of the display controlling section when the determination section determines that the contents are allowed to be copied.

The display device can prevent its own created contents from being protected against being copied by determining that data on the contents is allowed to be copied with this configuration. Thus, this improves convenience of the display device.

DETAILED DESCRIPTION OF THE PREFERRED EMBODIMENTS

An embodiment of an electronic book reader for viewing contents divided into a predetermined number of pages in an electronic book will be described as a picture display device according to the present invention with reference to drawings.

Figure 1:
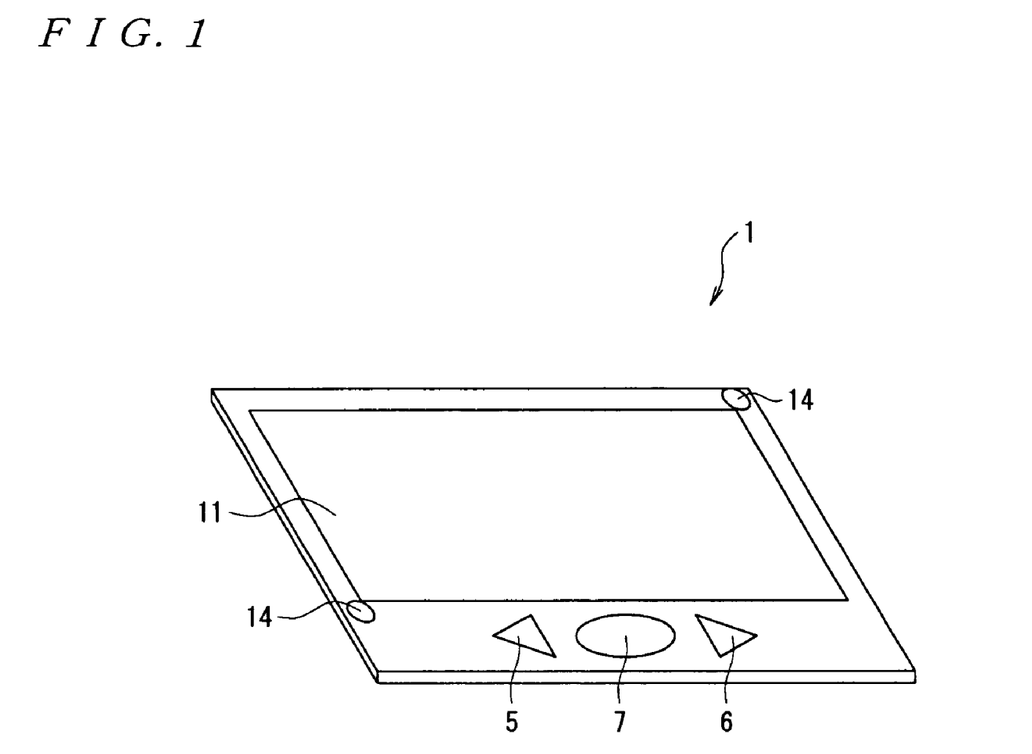
FIG. 1 is a schematic view of an electronic book reader of the first embodiment according to the present invention.
Figure 2:
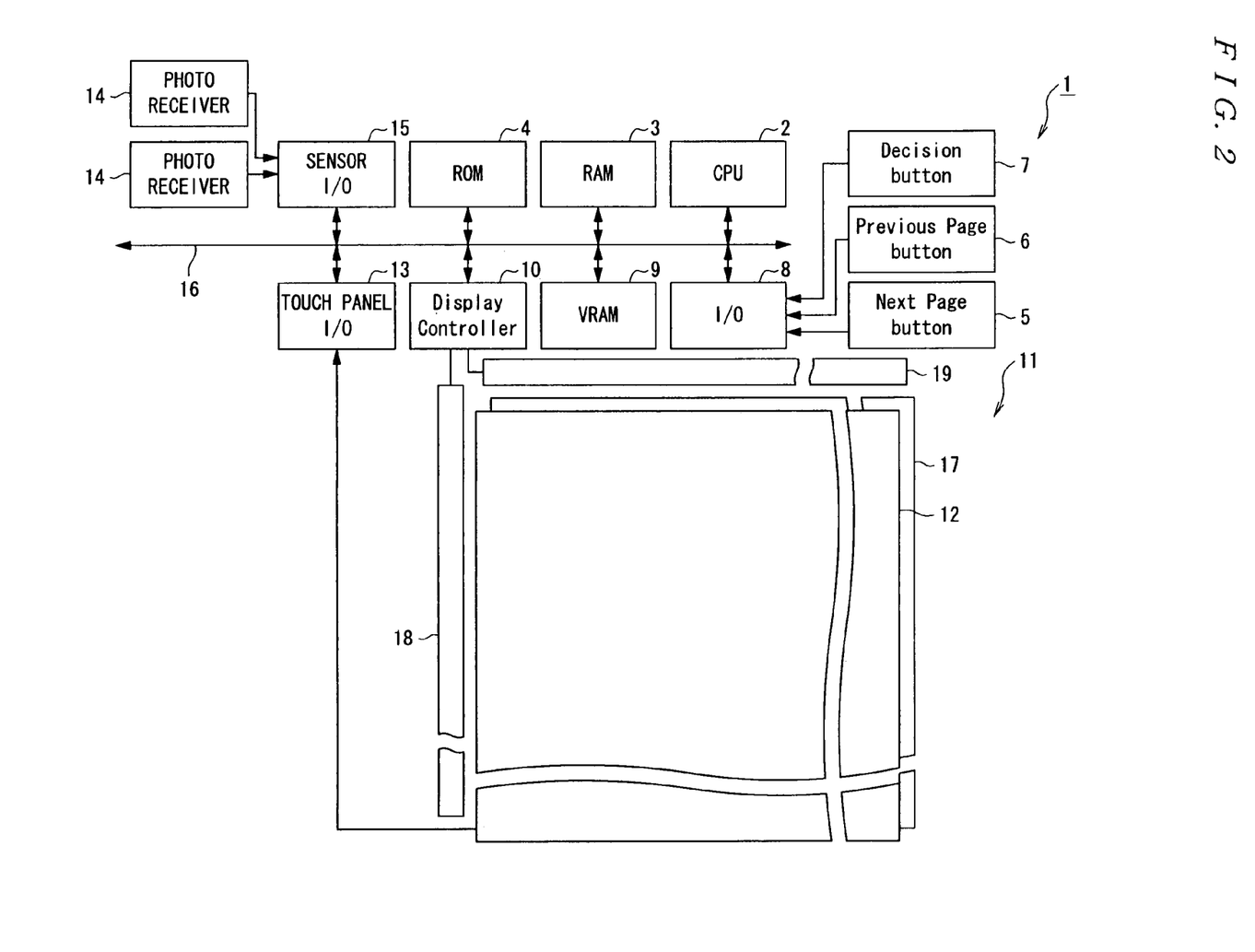
FIG. 2 is a block diagram illustrating an inner configuration of the electronic book reader shown in FIG. 1.

FIG. 1 is a schematic view of an outline of an embodiment of the present invention. FIG. 2 is a block diagram illustrating an inner configuration of the embodiment of the present invention. As shown in FIG. 2, electronic book reader 1 includes CPU (Central Processing Unit) 2, RAM (Random Access Memory) 3, ROM (Read Only Memory) 4, I/O 8 connected with Next Page button 5, Previous Page button 6, and Decision button 7, VRAM (Video Ram) 9, display controller 10, display device 11, touch panel I/O 13 connected with touch panel 12, and receiver I/O 15 connected with two photo receivers 14. All the parts but Next Page button 5, Previous Page button 6, Decision button 7, display device 11, touch panel 12, and photo receivers 14 are connected with each other via bus 16.

CPU 2 reads in various programs including a primary control program stored in ROM 4 and an application program and data, decompresses and executes the various programs and data on a work area provided in RAM 3, and controls each part of the electronic book reader. When a Next Page signal is output from I/O 8, CPU 2 generates picture data on contents of the page next to the page whose contents is currently displayed on display device 11 (hereinafter also referred to as raster data), and causes VRAM 9 to store the raster data.

For every predetermined time period (for example, 10 msec.), CPU 2 executes a process for deleting a display (to be described). When photo receiver 14 no longer detects light, CPU 2 controls display device 11 to delete the contents currently displayed on electrophoretic display 17 (to be described).

RAM 3 forms a work area where various programs are decompressed, and a memory area where data on the various processes to be executed by CPU 2 is decompressed.

ROM 4 stores a primary control program and various application programs to be executed by CPU 2 and data. The various programs and data are stored in ROM 4 in a form that can be read and executed by CPU 2.

I/O 8 is connected with Next Page button 5 for having display device 11 to switch its display from the current contents to the contents of the next page, Previous Page button 6 for having display device 11 to switch its display from the current contents to the contents of the previous page, and Decision button 7. When Next Page button 5 is pressed, I/O 8 outputs a Next Page signal to CPU2.

VRAM 9 stores raster data according to a writing request from CPU 2. VRAM 9 outputs the stored raster data to display controller 10 according to a reading request from display controller 10.

Display controller 10 reads out raster data stored in VRAM 9, and generates data for driving a gate driver and data for driving a source driver on the basis of the read out raster data. Display controller 10 distributes the generated data for driving a gate driver and data for driving a source driver to gate driver 18 (to be described) and source driver 19 (to be described) of display device 11.

Display device 11 has a display in the center of itself. The display shows contents by reflecting outside light incoming on electrophoretic display 17, i.e., a screen, where multiple pixels are arranged in arrays. The display keeps displaying the contents when the power supply is stopped. Display device 11 has gate driver 18 on the left of the face of electrophoretic display 17 and source driver 19 on the top of the face of electrophoretic display 17. Display device 11 displays raster data corresponding to data for driving a gate driver and data for driving a source driver output from display controller 10 (an image of contents) on electrophoretic display 17 by driving gate driver 18 and source driver 19 on the basis of the data for driving a gate driver and the data for driving a source driver and applying a predetermined voltage on each pixel of electrophoretic display 17.

Touch panel I/O 13 is connected with touch panel 12 covering the face of electrophoretic display 17. When touch panel 12 is pressed, touch panel I/O 13 outputs a touch panel signal indicating the pressed place to CPU2.

Receiver I/O 15 is connected with two photo receivers 14 placed in the upper right and the lower left to the face of electrophoretic display 17. Receiver I/O 15 detects the amount of light incoming on the face of electrophoretic display 17 and outputs the detected result to CPU 2.

Next, a display deleting process for deleting contents on electrophoretic display 17 when photo receiver 14 no longer detects light will be described with reference to a flowchart shown in FIG. 3. The display deleting process is a process executed at every predetermined time period. At step S101, the display device has each of two photo receivers 14 detect an amount of light incoming on electrophoretic display 17 and reads a result detected by each of two photo receivers 14.

Next, the operation continues to step S102, where the display device determines whether the screen is shielded, i.e., whether either or both of two photo receivers 14 are unable to detect light or not. If either or both of two photo receivers 14 are unable to detect light (Yes), the operation continues to step S103. If two photo receivers 14 are able to detect light (No), the calculation process ends. Whether photo receivers 14 are able to detect light or not may be determined in a method of determining whether the amount of incoming light detected at the step S101 is equal to or less than a first threshold, which is positive, (nearly equals 0); and if the amount is equal to or less than the first threshold, determining that the photo receivers are unable to detect light.

At step S103, CPU2 generates raster data that makes all the pixels of electrophoretic display 17 white, has VRAM9 store the raster data, and then finishes this calculating process.

Next, an operation of electronic book reader 1 of the embodiment will be described according to the specific case.

Figure 3:
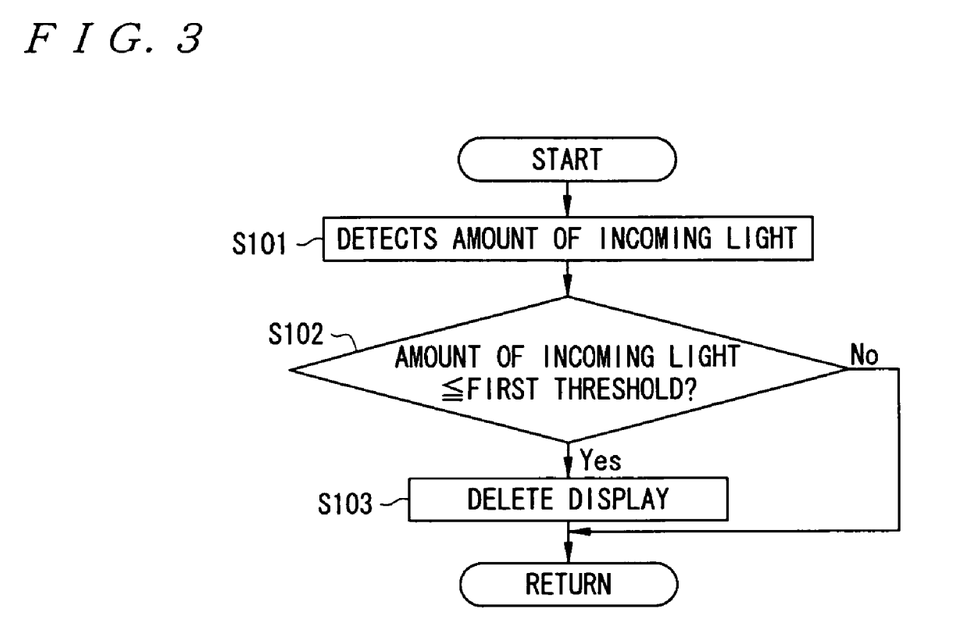
FIG. 3 is a flowchart illustrating a process for deleting a display.
Figure 4:
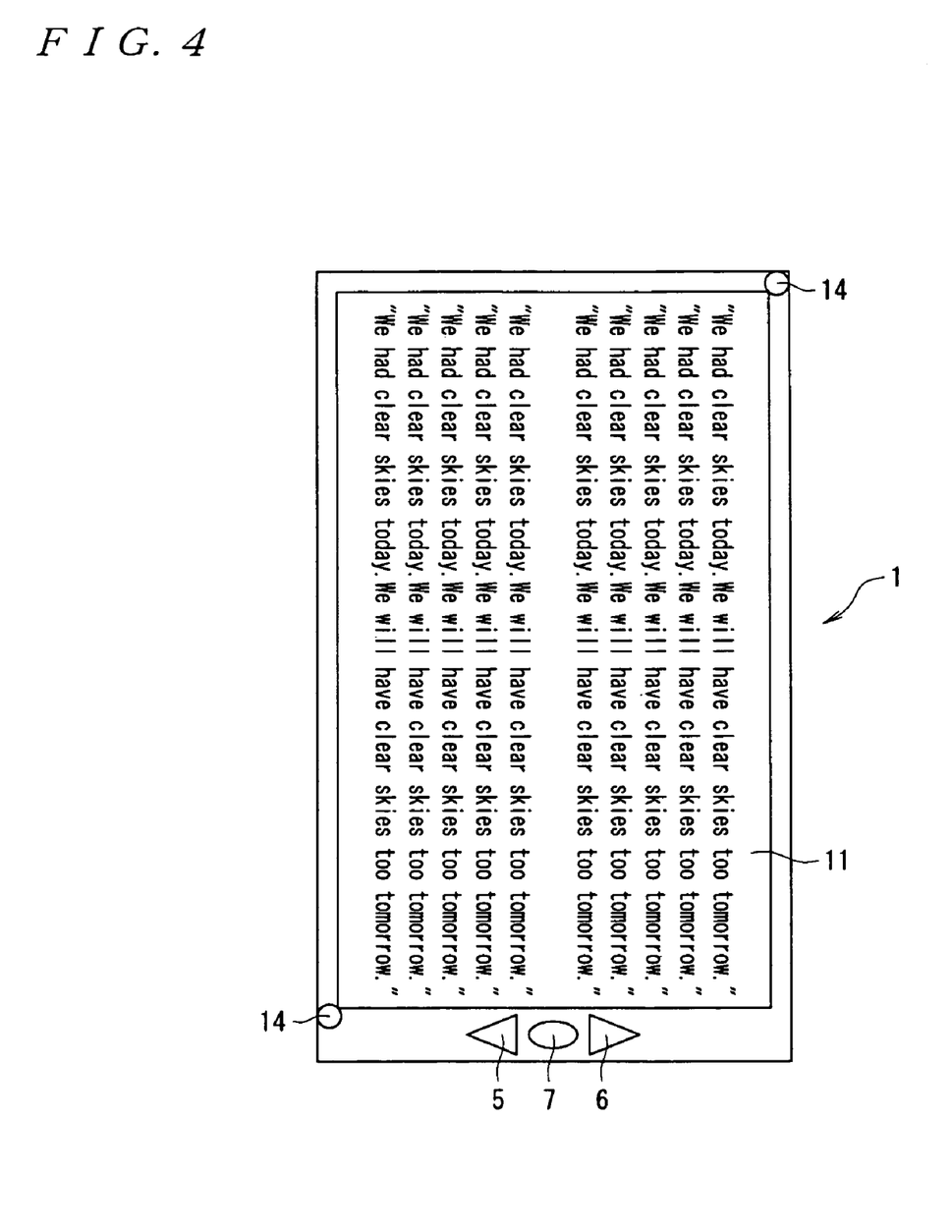
FIG. 4 is a schematic diagram for illustrating an operation of the first embodiment.

First, as shown in FIG. 4, when a user places the face of electronic book reader 1 on a contact glass of a copy machine to copy the contents on electrophoretic display 17 of electronic book reader 1, i.e., when the amounts of incoming light on electrophoretic display 17, which can be detected by two photo receivers, 14 are "0", CPU 2 considers that a display deleting process is performed. Then, as shown in FIG. 3, at step S101, the amounts of incoming light "0" on electrophoretic display 17 are read from two photo receivers 14, respectively. Then, the display device determines "Yes" at step S102, and generates raster data that makes all the pixels of electrophoretic display 17 white and has VRAM 9 store the raster data at step S103.

Figure 5:
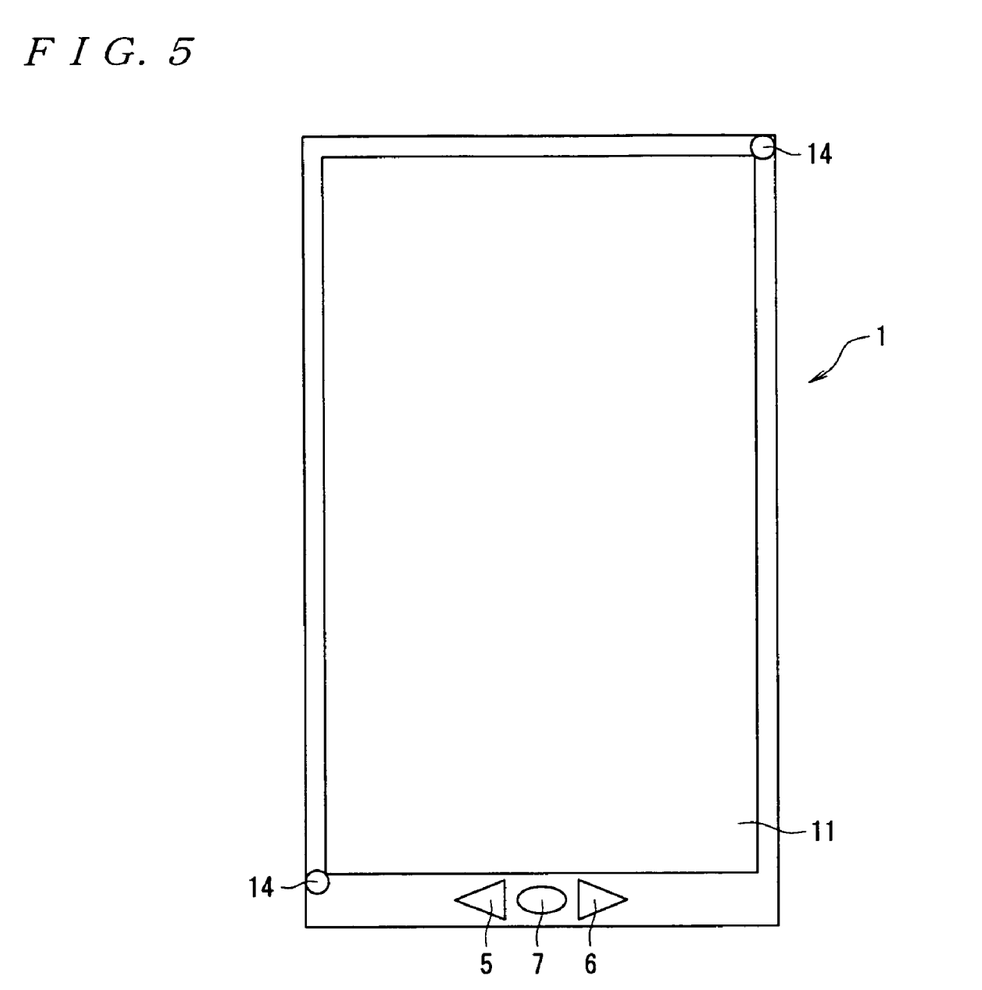
FIG. 5 is a schematic diagram for illustrating an operation of the first embodiment.

Display controller 10 reads out raster data stored in VRAM 9, and generates data for driving a gate driver and data for driving a source driver on the basis of the raster data read out from VRAM 9. The generated data for driving a gate driver and data for driving a source driver are output to display device 11. Then, display device 11 drives gate driver 18 and source driver 19 on the basis of the output data for driving a gate driver and data for driving a source driver and applies the equal voltage to all the pixels of electrophoretic display 17. As shown in FIG. 5, all the pixels of electrophoretic display 17 become white. As the result, all the contents on electrophoretic display 17 are deleted.

Electronic book reader 1 of the embodiment is adapted to make all the pixels of electrophoretic display 17 white when no light incomes on the face of electrophoretic display 17. When someone places the face of electrophoretic display 17 on a contact glass of a copy machine to copy the contents on electrophoretic display 17 as they are, the display device can delete all the contents currently displayed on electrophoretic display 17. As the result, the display device can prevent the contents on electrophoretic display 17 from being easily copied by the copy machine as they are.

Next, the second embodiment of a display device according to the present invention will be described. Unlike the first embodiment, the second embodiment makes all the pixels of electrophoretic display 17 white when the amount of light incoming on electrophoretic display 17 is equal to or more than a second threshold, which is sufficient amount, i.e., when scanning light emit from a copy machine incomes on electrophoretic display 17. Specifically, step S102 shown in FIG. 3 of a display deleting process executed by CPU 2 of the first embodiment is replaced with step S102' shown in FIG. 6. At step S102', the display device determines whether the amount of incoming light detected at step S101 is equal to or more than the second threshold (=the strength of scanning light emit from a copy machine). If the amount is equal to or more than the second threshold (Yes), the operation continues to step S103. Otherwise (No), the calculation process ends.

Figure 6:
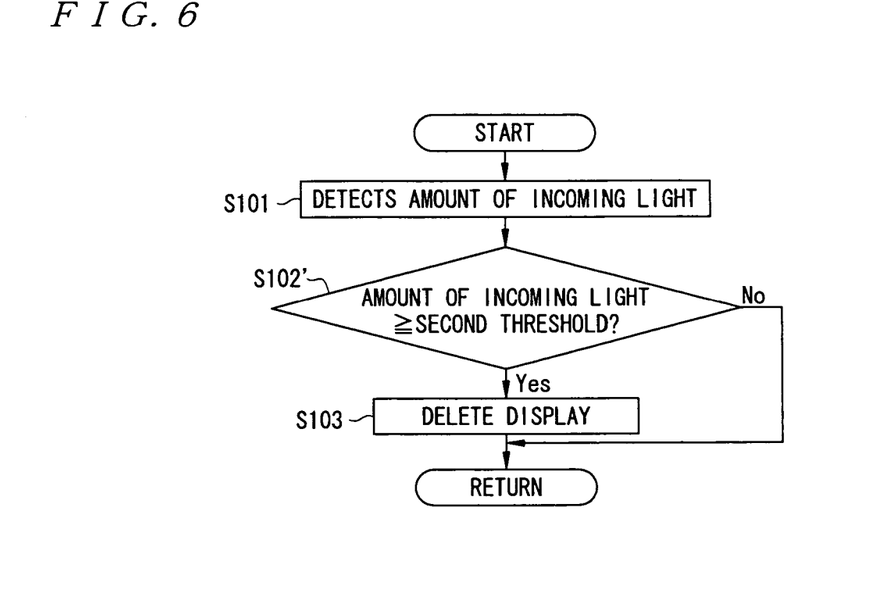
FIG. 6 is a flowchart illustrating a process for deleting a display of the second embodiment.

The calculation process shown in FIG. 6 includes many steps equivalent to those shown in FIG. 3 of the first embodiment. Thus, the same steps are denoted by the same reference numeral, and the detailed description of the steps will be omitted.

Electronic book reader 1 of the embodiment is adapted to make all the pixels of electrophoretic display 17 white when strong light incomes on the face of electrophoretic display 17. When someone places the face of electrophoretic display 17 on a contact glass of a copy machine to copy the contents on electrophoretic display 17 as they are and the copy machine emits scanning light over the contact glass, the display device can delete all the contents on electrophoretic display 17. As the result, the display device can prevent the contents on electrophoretic display 17 from being easily copied by the copy machine as they are.

Although the second embodiment exemplifies electrophoretic display 17 with photo receivers 14 on the upper right and the lower left to the face, the present invention is not limited to this example. If a driving method of electrophoretic display 17 is an active matrix driving method, the display device may be adapted to include photo receiver 14 on an active device (transistor) corresponding to each pixel of electrophoretic display 17. This can prevent photo receiver 14 from being prevented from detecting scanning light even when a user shields photo receiver 14 on purpose or by accident. Thus, the display device can more surely prevent contents on electrophoretic display 17 from being easily copied with a copy machine as they are.

Although the display device deletes all the contents on electrophoretic display 17 only when the amount of incoming light on electrophoretic display 17 is sufficiently high in the embodiment, the present invention is not limited to this example. The display device can be adapted to delete all the contents not only when the amount of light received by photo receiver 14 is equal to or more than the second threshold but also when the amount of light received by photo receiver 14 is equal to or less than the first threshold (nearly equals 0). With this configuration, the display device can delete all the contents even when a user shields photo receiver 14 on purpose or by accident and photo receiver 14 is prevented from detecting scanning light. Thus, the display device can more surely prevent contents on electrophoretic display 17 from being easily copied with a copy machine as they are.

The display device may be adapted to delete all the contents when a difference between amounts of incoming light detected by photo receivers 14 placed at the upper right and at the lower left to the face of electrophoretic display 17 is equal to or more than the third threshold (nearly equals 0). When someone places the face of electrophoretic display 17 on a contact glass of a copy machine in order to copy contents on electrophoretic display 17, then the copy machine starts emitting scanning light over the contact glass with the scanning light just incoming on the upper part of electrophoretic display 17 but not on the lower part electrophoretic display 17 yet, the display device can delete the contents. Thus, the display device can prevent contents on electrophoretic display 17 from being easily copied with a copy machine as they are.

Although the display device deletes all the contents on electrophoretic display 17 when it detects scanning light for copying the contents with a copy machine in the embodiment, the present invention is not limited to this example. The display device may be adapted to delete all the contents when it detects scanning light for image scanning the contents with a scanner, or when it detects flash light for imaging the contents with a digital camera.

Figure 7:
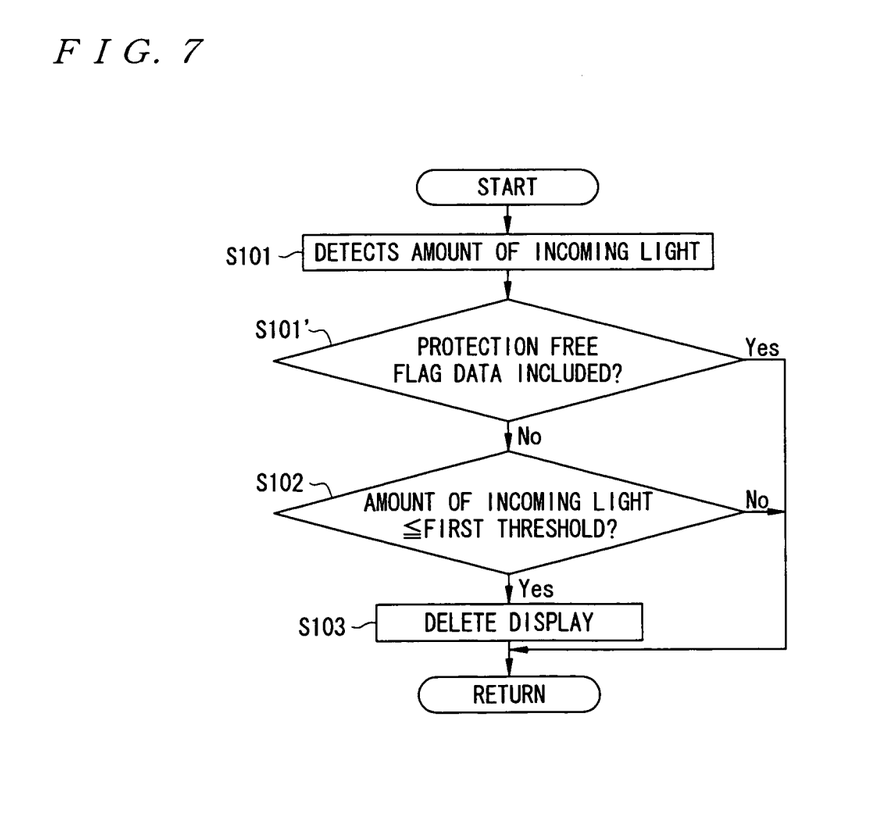
FIG. 7 is a flowchart illustrating a process for deleting a display of the third embodiment.

Next, the third embodiment of a display device according to the present invention will be described. Unlike the first embodiment, the third embodiment is adapted to forbid the operation to make all the pixels of electrophoretic display 17 white (adapted to prevent the contents on electrophoretic display 17 from being automatically deleted) when data on the contents on electrophoretic display 17 includes protection free flag data indicating that the contents need not to be protected by copyright, i.e., that the contents is allowed to be copied. Specifically, step S101' shown in FIG. 7 is inserted between steps S101 and S102 shown in FIG. 3, which are the steps for a display deleting process executed by CPU 2 in the first embodiment. At step S101', the display device determines whether data on the contents on electrophoretic display 17 includes protection free flag data or not. If the data does not include protection free flag data (No), the operation continues to step S102. If the data includes protection free flag data (Yes), the calculation process ends. The protection free flag data is the data only to be included in data on the contents when the contents are created (by the creator).

A calculation process shown in FIG. 7 includes many of the steps equivalent to those shown in FIG. 3 of the first embodiment. Thus, the steps of FIG. 7 equivalent to those of FIG. 3 are denoted by the same reference numerals and their description will be omitted.

Electronic book reader 1 of the embodiment is adapted to forbid the operation for making all the pixels of electrophoretic display 17 white when data on the contents includes protection free flag data. The display device can prevent its own made contents from being protected against being imaged (copied) by including the protection free flag data in data on the contents when it creates the contents.

Although the embodiment exemplifies the case that the display device prevents contents from being deleted when protection free flag data indicating that the contents need not to be protected by copyright, i.e., when the display device determines that the contents need not to be protected by copyright, the present invention is not limited to this example. The display device may be adapted to prevent the contents from being deleted when data on contents includes no data indicating that the contents need to be protected. Specifically, the display device may be adapted to prevent the contents from being deleted when it determines that data on contents includes no copy flag of SCMS (Serial Copy Management System) for preventing data from being copied for more than predetermined times. Then, in a form of copyright protection that needs contents to be authenticated in media ID method or the like, the display device is adapted to store authenticated contents in a memory space different from that for contents, which are not required to be protected by copyright.

In the embodiments, electrophoretic display 17 shown in FIG. 2 forms a display described within the scope of the invention. Similarly, photo receivers 14 shown in FIGS. 1 and 2 and step S101 shown in FIGS. 3 and 6 form a detecting section, CPU 2 shown in FIG. 2 and steps S102 and S103 shown in FIG. 3 and steps S102' and S103 shown in FIG. 6 form a display controlling section, and step S101' shown in FIG. 7 forms a determination section and an operation forbidding section.

The display device according to the present invention is not limited to what is written in the embodiment and may be altered within the scope of the invention if needed.

Although the embodiments exemplify the case that the display device deletes all the contents on electrophoretic display 17 on the basis of the detected result by photo receivers 14 provided on the upper right and the lower left to the face of electrophoretic display 17, the present invention is not limited to this example. The display device may be adapted to include a touch sensor for detecting something on the face of electronic book reader 1 instead of photo receivers 14, and delete all the contents on electrophoretic display 17 when the touch sensor detects something on the face of electrophoretic display 17. Then, the display device can delete all the contents on electrophoretic display 17 when someone places the face of electrophoretic display 17 on a contact glass of an optical copy machine in order to copy contents on electrophoretic display 17 and the face of electrophoretic display 17 touches the contact glass.

Figure 8:
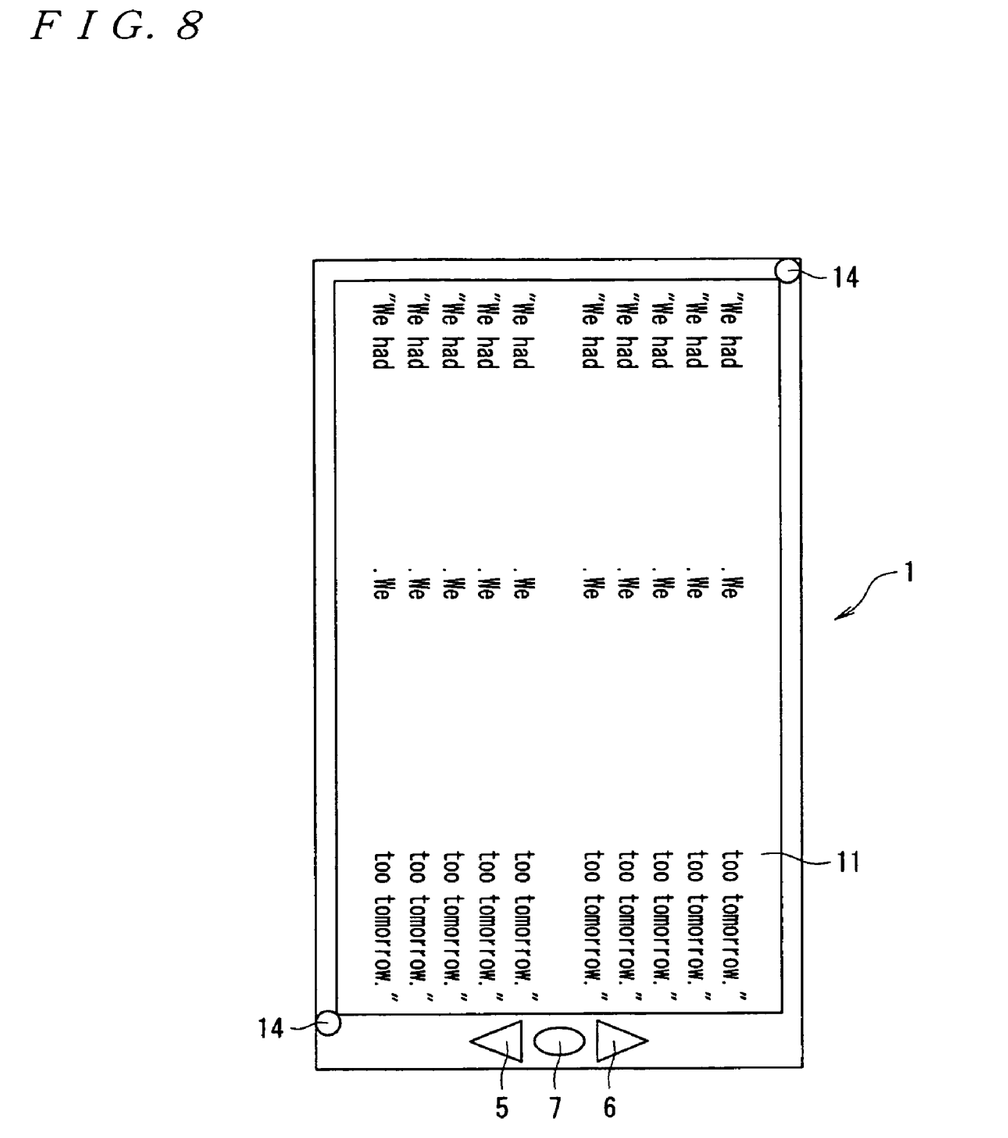
FIG. 8 is a schematic diagram for illustrating a modification of the present invention.
Figure 9:
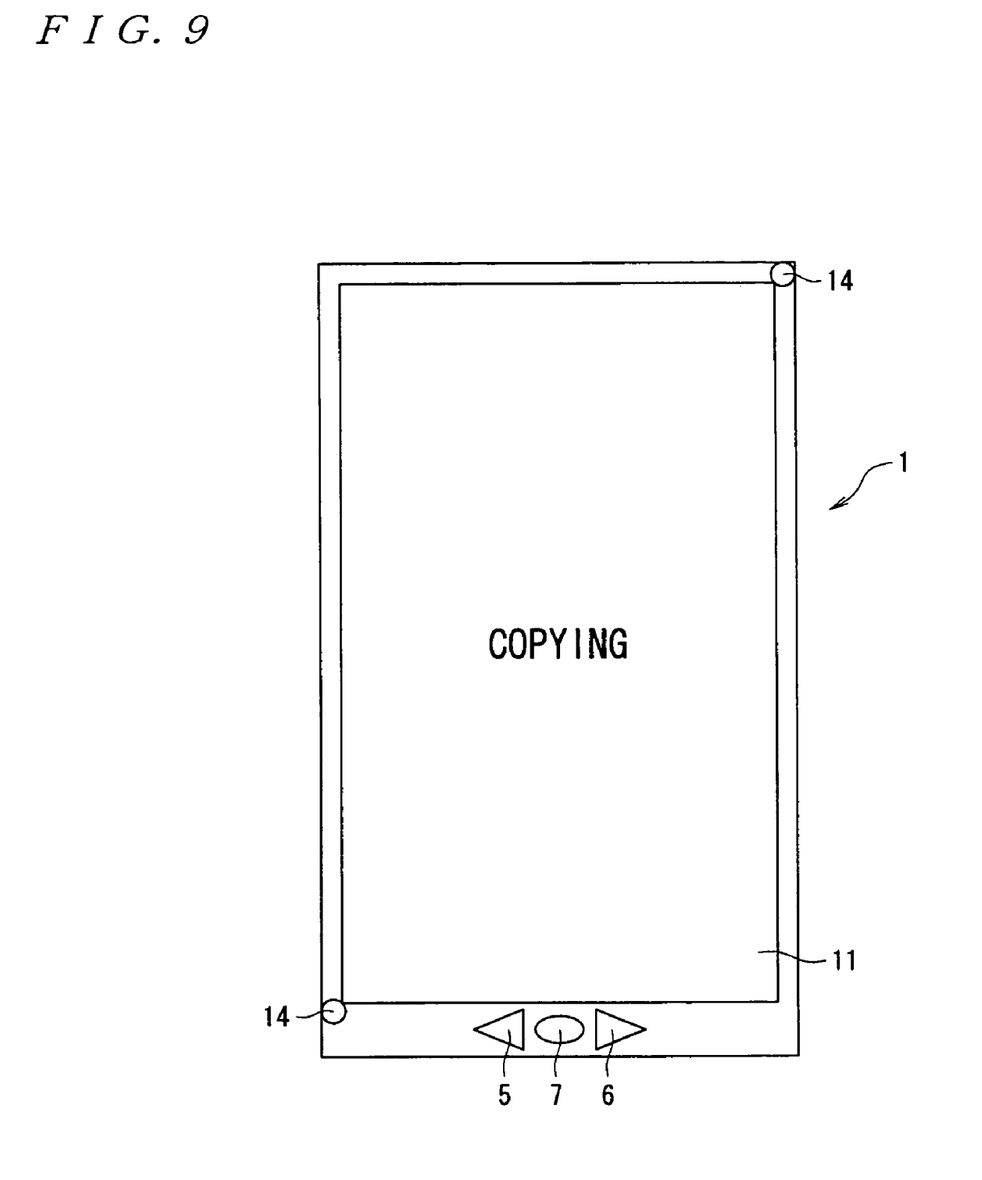
FIG. 9 is a schematic diagram for illustrating a modification of the present invention.

Although the embodiments exemplify the case that the display device deletes all the contents on electrophoretic display 17 by making all the pixels of electrophoretic display 17 white, the present invention is not limited to this example. The display device may be adapted to delete only a part of the contents as shown in FIG. 8, or may be adapted to display another contents.

Although the embodiments exemplify the case that the display device employs electrophoretic display 17, which is a reflection display, as a display for contents of an electronic book, the present invention is not limited to this example. The display device may be adapted to employ a reflection display other than electrophoretic display 17, such as a Cholestric liquid crystal.

Although the embodiments exemplify the case that the display device simply deletes contents on electrophoretic display 17, the present invention is not limited to this example. The display device may be adapted to easily display deleted contents again with the configuration that contains a state keeping part for keeping raster data of the contents on electrophoretic display 17 in electronic book reader 1 and uses the raster data kept in the state keeping part in order to display the deleted contents again.

What is claimed is:

1. A hand-held device including a memory display to keep displaying content even after power supply stops, the hand-held device comprising:
    a detecting section that detects that something touches a display screen by using a touch sensor;
    a display controlling section that deletes all of the content when the detecting section detects that something touches the display screen;
    a determination section that determines whether the content is allowed to be copied; and
    an operation forbidding section that forbids an operation of the display controlling section when the determination section determines that the content is allowed to be copied.

2. The hand-held device according to claim 1, wherein said memory display is a reflection display that displays contents by reflecting outside light incoming on the screen.

3. The hand-held device according to claim 1, wherein a driving method of said memory display is an active matrix driving method and wherein said detecting section comprises a photo receiver provided for an active device corresponding to each pixel of said display.

4. The hand-held device according to claim 1, said memory display is an electrophoretic display.

5. A hand-held device including a memory display to keep displaying content even after power supply stops, the hand-held device comprising:
    a detecting section that detects an amount of incoming light on a display screen displaying the content;
    a display controlling section that deletes all of the content when the detecting section determines that at least one of:

the amount of the incoming light is equal to or smaller than a first threshold;

the amount of the incoming light is equal to or greater than a second threshold; and a difference between the amount of the incoming light at different positions is equal to or greater than a third threshold;

a determination section that determines whether the content is allowed to be copied; and an operation forbidding section that forbids an operation of the display controlling section when the determination section determines that the content is allowed to be copied.

6. The hand-held device according to claim 5, wherein said memory display is a reflection display that displays contents by reflecting outside light incoming on the screen.

7. The hand-held device according to claim 5, wherein a driving method of said memory display is an active matrix driving method and wherein said detecting section comprises a photo receiver provided for an active device corresponding to each pixel of said display.

8. The hand-held device according to claim 5, said memory display is an electrophoretic display.

* * * * *

UNITED STATES PATENT AND TRADEMARK OFFICE
CERTIFICATE OF CORRECTION

| | | |
|---|---|---|
| PATENT NO. | : 7,627,907 B2 | Page 1 of 1 |
| APPLICATION NO. | : 11/010245 | |
| DATED | : December 1, 2009 | |
| INVENTOR(S) | : Sawada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Second Day of November, 2010

David J. Kappos
*Director of the United States Patent and Trademark Office*